(12) United States Patent
Onohara et al.

(10) Patent No.: US 9,585,089 B2
(45) Date of Patent: Feb. 28, 2017

(54) CONTROLLER, ELECTRONIC APPARATUS, CONTROL SYSTEM, AND CONTROL METHOD FOR COMMUNICATING VIA FIRST OR SECOND COMMUNICATION SYSTEM BASED ON SYSTEM PRIORITY INFORMATION

(71) Applicant: Sony Corporation, Minato-ku (JP)

(72) Inventors: Takashi Onohara, Tokyo (JP); Ryo Sokabe, Saitama (JP); Takuma Higo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/540,128

(22) Filed: Nov. 13, 2014

(65) Prior Publication Data

US 2015/0181515 A1 Jun. 25, 2015

(30) Foreign Application Priority Data

Dec. 24, 2013 (JP) ................................. 2013-265741

(51) Int. Cl.
*H04W 48/18* (2009.01)
*H04W 4/00* (2009.01)
*H04W 48/16* (2009.01)
*H04W 88/06* (2009.01)

(52) U.S. Cl.
CPC ........... *H04W 48/18* (2013.01); *H04W 4/008* (2013.01); *H04W 48/16* (2013.01); *H04W 88/06* (2013.01)

(58) Field of Classification Search
None
See application file for complete search history.

(56) References Cited

U.S. PATENT DOCUMENTS

2009/0254666 A1* 10/2009 Agulnik .............. H04L 12/5692
709/228
2011/0153807 A1* 6/2011 Vicisano ........... H04L 29/12066
709/224
2011/0252357 A1* 10/2011 Chaudhri ............ G06F 3/04883
715/780

(Continued)

FOREIGN PATENT DOCUMENTS

JP 2006-54841 2/2006
JP 2010-531565 9/2010

(Continued)

*Primary Examiner* — Alejandro Rivero
(74) *Attorney, Agent, or Firm* — Oblon, McClelland, Maier & Neustadt, L.L.P.

(57) ABSTRACT

A controller includes: a communication section configured to be selectively communicable with an electronic apparatus through a first communication system or a second communication system, and configured to acquire system priority information from the electronic apparatus by communicating with the electronic apparatus through the first communication system, the electronic apparatus being capable of executing one or a plurality of functions; and a control section configured to select one of the first communication system and the second communication system, based on the system priority information, and configured to instruct the communication section to communicate with the electronic apparatus through the selected communication system.

13 Claims, 14 Drawing Sheets

(56) References Cited

U.S. PATENT DOCUMENTS

| | | | | |
|---|---|---|---|---|
| 2013/0229976 A1* | 9/2013 | Srinivasan | ............ | H04W 36/22 |
| | | | | 370/315 |
| 2014/0010515 A1* | 1/2014 | Lee | ...................... | H04L 65/605 |
| | | | | 386/207 |
| 2014/0073255 A1* | 3/2014 | Kuscher | .................. | H04W 4/18 |
| | | | | 455/41.3 |

FOREIGN PATENT DOCUMENTS

| | | |
|---|---|---|
| JP | 2012-15725 | 1/2012 |
| JP | 2013-528018 | 7/2013 |

\* cited by examiner

CONTROLLER, ELECTRONIC APPARATUS, CONTROL SYSTEM, AND CONTROL METHOD FOR COMMUNICATING VIA FIRST OR SECOND COMMUNICATION SYSTEM BASED ON SYSTEM PRIORITY INFORMATION

CROSS REFERENCE TO RELATED APPLICATIONS

This application claims the benefit of Japanese Priority Patent Application JP 2013-265741 filed Dec. 24, 2013, the entire contents of which are incorporated herein by reference.

BACKGROUND

The present disclosure relates to a controller, an electronic apparatus controlled by the controller, a control system provided with the controller and the electronic apparatus, and a control method used in the control system.

In recent years, a communication function is mounted on various electronic apparatuses. Such electronic apparatuses are allowed to operate in conjunction with one another by communicating with one another, which makes it possible to enhance usability of a user. Examples of systems of such communication may include wireless local area network (LAN), Bluetooth (registered trademark), TransferJet (registered trademark), near field communication (NFC), universal serial bus (USB), and wired LAN.

Incidentally, there is a communication system that performs communication with use of a plurality of communication paths. For example, in Japanese Unexamined Patent Application Publication Nos. 2006-54841 and 2012-15725 and Japanese Unexamined Patent Application Publication (Translation of PCT Application) Nos. 2010-531565 and 2013-528018, wired or wireless communication apparatuses that change over a communication path based on contents to be transmitted or received, used application, etc. have been disclosed.

SUMMARY

The above-described communication systems between the electronic apparatuses have respective characteristics in communication speed, communication distance, power consumption, and the like. Therefore, in the case where the communication is performed between the electronic apparatuses, the communication is expected to be performed by a desirable communication system in consideration of these characteristics.

It is desirable to provide a controller, an electronic apparatus, a control system, and a control method that are capable of performing communication by a desirable communication system.

According to an embodiment of the disclosure, there is provided a controller including: a communication section configured to be selectively communicable with an electronic apparatus through a first communication system or a second communication system, and configured to acquire system priority information from the electronic apparatus by communicating with the electronic apparatus through the first communication system, the electronic apparatus being capable of executing one or a plurality of functions; and a control section configured to select one of the first communication system and the second communication system, based on the system priority information, and configured to instruct the communication section to communicate with the electronic apparatus through the selected communication system.

According to an embodiment of the disclosure, there is provided an electronic apparatus including: a communication section configured to be selectively communicable with a controller through a first communication system or a second communication system, and configured to communicate with the controller through the first communication system to supply system priority information to the controller; and a processing section configured to be capable of executing one or a plurality of functions, and configured to generate the system priority information.

According to an embodiment of the disclosure, there is provided a control system provided with a controller and an electronic apparatus. The controller includes a first communication section configured to be selectively communicable with the electronic apparatus through a first communication system or a second communication system, and configured to communicate with the electronic apparatus through the first communication system to acquire system priority information from the electronic apparatus, and a control section configured to select one of the first communication system and the second communication system, based on the system priority information, and configured to instruct the first communication section to communicate with the electronic apparatus through the selected communication system. The electronic apparatus includes a second communication section configured to be selectively communicable with the controller through the first communication system or the second communication system, and configured to communicate with the controller through the first communication system to supply the system priority information to the controller, and a processing section configured to be capable of executing one or a plurality of functions, and configured to generate the system priority information.

According to an embodiment of the disclosure, there is provided a control method including: allowing an electronic apparatus to generate system priority information and to supply the system priority information to a controller through a first communication system, the electronic apparatus being configured to selectively communicable with the controller through the first communication system or a second communication system; allowing the controller to select one of the first communication system and the second communication system based on the system priority information, and to communicate with the electronic apparatus through the selected communication system; and allowing the electronic apparatus to execute one or a plurality of functions in response to the communication with the controller.

In the controller, the control system, and the control method according to the respective embodiments of the disclosure, the communication is selectively performed between the controller and the electronic apparatus through the first communication system or the second communication system. At this time, in the controller, one of the first communication system and the second communication system is selected based on the system priority information supplied from the electronic apparatus, and the communication with the electronic apparatus is performed through the selected communication system.

In the electronic apparatus, the control system, and the control method according to the respective embodiments of the disclosure, the communication is selectively performed between the controller and the electronic apparatus through the first communication system or the second communication system. At this time, the system priority information is generated in the electronic apparatus, and is then supplied to the controller.

According to the controller, the electronic apparatus, the control system, and the control method according to the respective embodiments of the disclosure, the electronic apparatus generates the system priority information, and the controller acquires the system priority information from the electronic apparatus and selects the communication system based on the system priority information. Therefore, communication is allowed to be performed through the desired communication system. Note that the effects described here are not necessarily limited, and any effects described in the present disclosure may be obtained.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the present disclosure will be described in detail with reference to drawings.

Embodiment

[Configuration Example]

Figure 1:
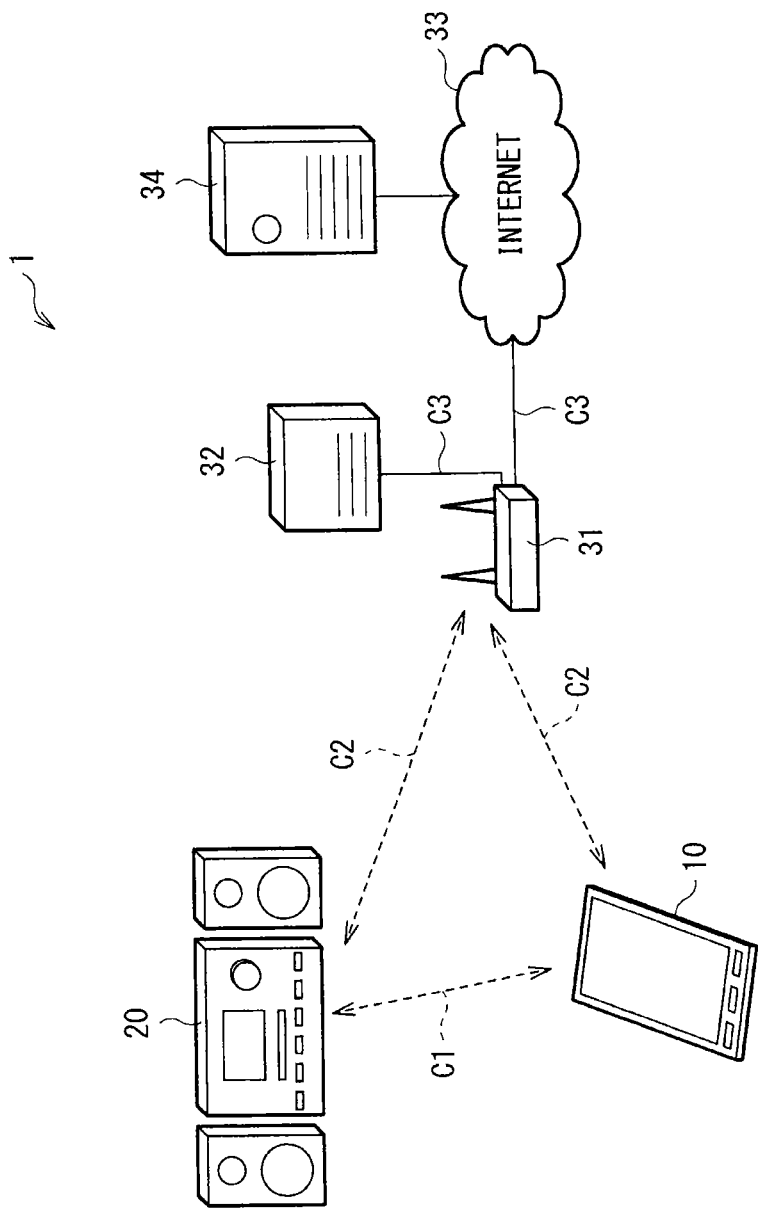
FIG. 1 is an explanatory diagram illustrating a configuration example of an audio system according to an embodiment of the disclosure.

FIG. 1 illustrates a configuration example of an audio system according to an embodiment. An audio system 1 is configured to be communicable with a plurality of communication methods. Note that the controller, the electronic apparatus, the control system, and the control method according to the respective embodiments of the disclosure are embedded by the present embodiment, and therefore are described together. The audio system 1 includes a mobile unit 10, an audio apparatus 20, an access point 31, a media server 32, and a server 34.

The mobile unit 10 is a multifunction mobile phone (a so-called smartphone) in this example. In this example, the mobile unit 10 is capable of controlling operation of the audio apparatus 20 by communicating with the audio apparatus 20 through Bluetooth communication C1 or wireless LAN communication C2.

Incidentally, in this example, the multifunction mobile phone is used as the mobile unit 10. However, the mobile unit 10 is not limited thereto, and any electronic apparatus may be used as long as it controls operation of the audio apparatus 20. Specifically, for example, a so-called tablet terminal and a notebook personal computer (PC) may be used. Moreover, this is not limited to such a portable electronic apparatus, and may be a stationary electronic apparatus. Specifically, for example, a desktop PC may be used.

Figure 2:
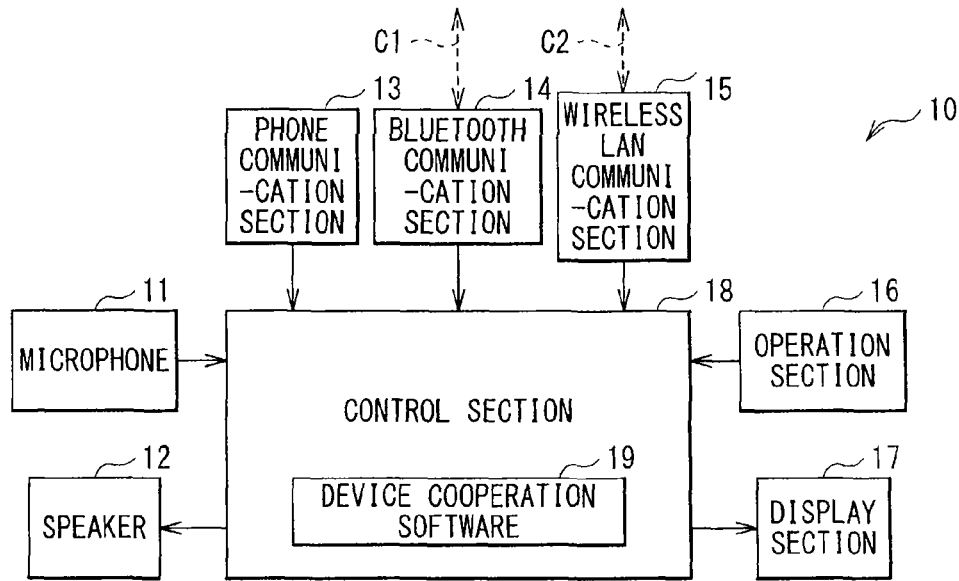
FIG. 2 is a block diagram illustrating a configuration example of a mobile unit illustrated in FIG. 1.

FIG. 2 illustrates a configuration example of the mobile unit 10. The mobile unit 10 includes a microphone 11, a speaker 12, a phone communication section 13, a Bluetooth communication section 14, a wireless LAN communication section 15, an operation section 16, a display section 17, and a control section 18.

The microphone 11 converts sound into an electric signal, and the speaker 12 makes a sound based on the electric signal. The phone communication section 13 performs wireless communication with a base station of a mobile phone.

The Bluetooth communication section 14 communicates with the audio apparatus 20 through the Bluetooth communication C1. The Bluetooth communication C1 is a communication system by short-distance wireless communication, and for example, may allow communication with low power consumption. As will be described later, the mobile unit 10 is allowed to perform the Bluetooth communication C1 with the audio apparatus 20 by performing a so-called pairing procedure. As a result, the mobile unit 10 easily communicates with the audio apparatus 20 without complicated setting by a user.

Incidentally, in this example, Bluetooth is used as the communication system. However, the communication system is not limited thereto, and TransferJet, NFC, etc. may be used. Moreover, the communication is not limited to such wireless communication, and communication is performed by wired system such as USB.

The wireless LAN communication section 15 communicates with the audio apparatus 20 via the access point 31 through the wireless LAN communication C2. The wireless LAN communication C2 is a communication system allowing a larger number of electronic apparatuses to perform communication at a communication speed higher than those of the Bluetooth communication C1. Moreover, the wireless LAN communication section 15 communicates with the media server 32 connected to the access point 31 and the server 34 connected to the Internet 33 via the access point 31.

Incidentally, in this example, wireless LAN is used as the communication system. However, the communication system is not limited thereto, and any communication system may be used as long as the communication system allows communication with the media server 32, the server 34, and the like. Moreover, the communication system is not limited to the wireless communication, and the communication may be performed by a wired system such as a wired LAN.

The operation section 16 is a user interface by which a user operates the mobile phone 10, and for example, may be configured using a touch panel or the like. The display section 17 is a user interface displaying an operation state and functions of the mobile unit 10, and for example, may be configured using a liquid crystal display section, an organic electroluminescence (EL) display section, or the like.

The control section 18 controls each block in the mobile unit 10, based on instruction from the operation section 16. In addition, the control section 18 has a function of communicating with the audio apparatus 20 via the Bluetooth communication section 14 through the Bluetooth communication C1, or communicating with the audio apparatus 20 via the wireless LAN communication section 15 through the wireless LAN communication C2, to control the audio apparatus 20.

The mobile unit 10 has various pre-installed software, and further, is configured to allow various software to be installed. Further, the control section 18 executes these software to allow the mobile unit 10 to perform various functions according to the respective software. In the mobile unit 10, device cooperation software 19 that allows the mobile unit 10 and the audio apparatus 20 to operate in conjunction with each other is installed.

The device cooperation software 19 collectively manages a function F10 that relates to the audio apparatus 20 out of the functions held by the mobile unit 10 and a function F20 held by the audio apparatus 20. Here, the function F10 is a function in which the mobile unit 10 allows the audio apparatus 20 to reproduce music and the like through communication between the mobile unit 10 and the audio apparatus 20. The function F20 is a function in which the audio apparatus 20 receives an instruction from the mobile unit 10 and reproduces music and the like based on the instruction through communication between the mobile unit 10 and the audio apparatus 20. Then, the device cooperation software 19 displays icons relating to the functions F10 and F20 in one screen when the user operates the audio apparatus 20 with use of the mobile unit 10, as will be described later. As a result, the user is allowed to operate the audio apparatus 20 seamlessly without being conscious of the communication system (the Bluetooth communication C1 or the wireless LAN communication C2) between the mobile unit 10 and the audio apparatus 20, and whether the function is held by the mobile unit 10 or the audio apparatus 20.

The audio apparatus 20 is a stationary audio apparatus in this example, and for example, may reproduce music based on music data recorded in a compact disc or the media server 32, or may acquire music data from the server 34 by download or streaming to reproduce music. The audio apparatus 20 communicates with the mobile unit 10 through the Blue tooth communication C1 or the wireless LAN communication C2, and operates in conjunction with the mobile unit 10 in this example.

Incidentally, in this example, the stationary audio apparatus 20 is used. However, the audio apparatus 20 is not limited thereto, and for example, a portable audio apparatus may be used or another electronic apparatus having a similar function to that of the audio apparatus 20 may be used. Specifically, a tablet terminal, a notebook PC, a desktop PC, and the like may be used.

Figure 3:
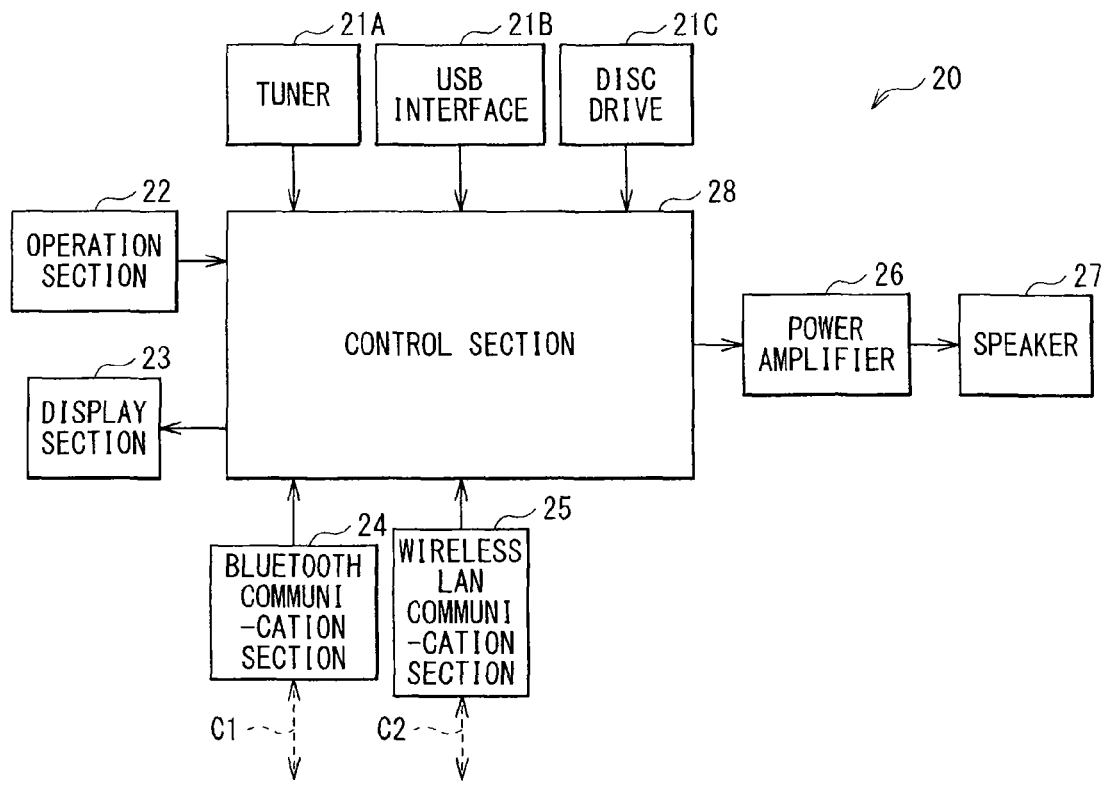
FIG. 3 is a block diagram illustrating a configuration example of an audio apparatus illustrated in FIG. 1.

FIG. 3 illustrates a configuration example of the audio apparatus 20. The audio apparatus 20 includes a tuner 21A, an USB interface 21B, a disc drive 21C, an operation section 22, a display section 23, a Bluetooth communication section 24, a wireless LAN communication section 25, a control section 28, a power amplifier 26, and a speaker 27.

The tuner 21A, the USB interface 21B, and the disc drive 21C are sound sources of the audio apparatus 20. Specifically, the tuner 21A receives FM broadcasting, AM broadcasting, and the like. The USB interface 21B is used to USB connection with an external electronic apparatus, and acquires music data and the like that are stored in the external electronic apparatus through the USB connection. The disc drive 21C is a drive for a compact disc in this example, and reads out music data stored in the compact disc.

The operation section 22 is a user interface by which the user operates the audio apparatus 20, and for example, may be configured using various kinds of buttons, dials, and touch panels. The display section 23 is a user interface displaying the operation state and the functions of the audio apparatus 20, and for example, may be configured using a liquid crystal display section, an organic EL display section, or the like.

The Bluetooth communication section 24 communicates with the mobile unit 10 through the Bluetooth communication C1.

The wireless LAN communication section 25 communicates with the mobile unit 10 via the access point 31 through the wireless LAN communication C2. Further, the wireless LAN communication section 25 communicates with the media server 32 connected to the access point 31 and the server 34 connected to the Internet 33 via the access point 31.

The control section 28 controls each block in the audio apparatus 20, based on instruction from the operation section 22. Moreover, the control section 28 has a function of communicating with the mobile unit 10 via the Bluetooth communication section 24 through the Bluetooth communication C1, or communicating with the mobile unit 10 via the wireless LAN communication section 25 through the wireless LAN communication C2, to receive an instruction from the mobile unit 10, and controlling each block in the audio apparatus 20 based on the instruction. Specifically, for example, the control section 28 may select one of the tuner 21A, the USB interface 21B, and the disc drive 21C as the sound source, and supplies music data that is supplied from the sound source, as an analog signal to the power amplifier 26. Further, for example, the control section 28 supplies the music data that is supplied from the mobile unit 10 through the Bluetooth communication C1 and the music data that is supplied from the media server 32 or the server 34 through the wireless LAN communication C2, as an analog signal to the power amplifier 26.

The power amplifier 26 amplifies the analog signal supplied from the control section 28, and drives the speaker 27. The speaker 27 makes a sound based on the drive by the power amplifier 26.

The access point 31 is an access point for the wireless LAN, and performs the wireless LAN communication C2 between the mobile unit 10 and the audio apparatus 20. In addition, the access point 31 communicates with the media server 32 through wired LAN communication C3, and communicates with the server 34 through the Internet 33.

The media server 32 stores therein music data and the like in this example, and supplies the data to the mobile unit 10 and the audio apparatus 20 through the network (the wireless LAN communication C2 and the wired LAN communication C3) in response to the instruction from the mobile unit 10 and the audio apparatus 20. In this example, the media server 32 communicates with the access point 31 through the wired LAN communication C3.

The server 34 performs music distribution service in this example. Specifically, the server 34 supplies the music data to the mobile unit 10 and the audio apparatus 20 by download or streaming in response to request from the mobile unit 10 and the audio apparatus 20.

Here, the mobile unit 10 corresponds to a specific example of "controller" in the present disclosure. The audio apparatus 20 corresponds to a specific example of "electronic apparatus" in the present disclosure. The Bluetooth communication C1 corresponds to a specific example of "first communication system" in the present disclosure, and the wireless LAN communication C2 corresponds to a specific example of "second communication system" in the present disclosure. The Bluetooth communication section 14 and the wireless LAN communication section 15 correspond to a specific example of "communication section" of the "controller" in the present disclosure. The Bluetooth communication section 24 and the wireless LAN communication section 25 correspond to a specific example of "communication section" of the "electronic apparatus" in the present disclosure. The control section 28 corresponds to a specific example of "processing section" in the present disclosure.

[Operation and Function]

Subsequently, operation and a function of the audio system 1 according to the present embodiment will be described.

(Overall Operation Outline)

First, overall operation outline of the audio system 1 is described with reference to FIG. 1 to FIG. 3. The mobile unit 10 communicates with the audio apparatus 20 through the Bluetooth communication C1 or the wireless LAN communication C2 to control the operation of the audio apparatus 20. Specifically, the Bluetooth communication section 14 communicates with the audio apparatus 20 through the Bluetooth communication C1. The wireless LAN communication section 15 communicates with the audio apparatus 20 via the access point 31 through the wireless LAN communication C2, and communicates with the media server 32 connected to the access point 31 and the server 34 connected to the Internet 33 via the access point 31. The display section 17 displays the operation state and the functions of the mobile unit 10. The user operates the mobile unit 10 with use of the operation section 16. The control section 18 controls each block in the mobile unit 10 based on instruction from the operation section 16. Further, the control section 18 communicates with the audio apparatus 20 via the Bluetooth communication section 14 through the Bluetooth communication C1, or communicates with the audio apparatus 20 via the wireless LAN communication section 15 through the wireless LAN communication C2, to control the audio apparatus 20. The device cooperation software 19 collectively manages the function F10 that allows the audio apparatus 20 to reproduce music out of the functions held by the mobile unit 10 and the function F20 held by the audio apparatus 20.

The audio apparatus 20 communicates with the mobile unit 10 through the Bluetooth communication C1 or the wireless LAN communication C2, and operates in conjunction with the mobile unit 10 to reproduce music and the like. Specifically, the tuner 21A receives FM broadcasting, AM broadcasting, and the like, the USB interface 21B acquires music data and the like stored in an external electronic apparatus, and the disc drive 21C reads out music data stored in a compact disc. The display section 23 displays the operation state and the functions of the audio apparatus 20. The user operates the audio apparatus 20 with use of the operation section 22. The Bluetooth communication section 24 communicates with the mobile unit 10 through the Bluetooth communication C1. The wireless LAN communication section 25 communicates with the mobile unit 10 via the access point 31 through the wireless LAN communication C2, and communicates with the media server 32 connected to the access point 31 and the server 34 connected to the Internet 33 via the access point 31. The control section 28 controls each block in the audio apparatus 20 based on the instruction from the operation section 22. Further, the control section 28 communicates with the mobile unit 10 via the Bluetooth communication section 24 through the Bluetooth communication C1, or communicates with the mobile unit 10 via the wireless LAN communication section 25 through the wireless LAN communication C2, to receive the instruction from the mobile unit 10, and controls each block in the audio apparatus 20 based on the instruction. Then, the control section 28 supplies the analog signal to the power amplifier 26, and the speaker 27 makes a sound.

(Device Cooperation Software 19)

The device cooperation software 19 collectively manages the function F10 that allows the audio apparatus 20 to reproduce music out of the functions held by the mobile unit 10 and the function F20 held by the audio apparatus 20. The device cooperation software 19 will be described in detail below.

Figure 4:
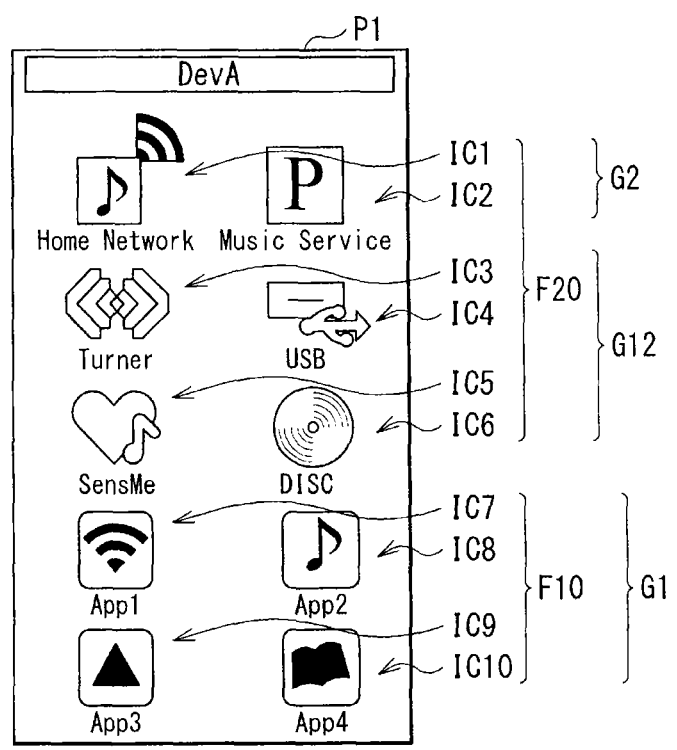
FIG. 4 is an image diagram illustrating an example of a display screen of the mobile unit illustrated in FIG. 1.

FIG. 4 illustrates a display screen P1 displayed on the display section 17 of the mobile unit 10 when the device cooperation software 19 is executed. The display screen P1 is displayed when the user operates the audio apparatus 20 with use of the mobile unit 10. Incidentally, in this example, the display section 17 displays the display screen P1 as it is; however, this is not limitative, and for example, a configuration in which the display section 17 displays a part of the display screen P1 and the user operates a scroll bar or the like to view the entire display screen P1 may be employed. The functions F10 and F20 relating to the audio apparatus 20 are displayed as icons IC1 to IC10 on the display screen P1. Incidentally, in this example, the device name of the audio apparatus 20 is "DevA". The functions represented by the icons IC1 to IC6 are the function F20 held by the audio apparatus 20, and the functions represented by the icons IC7 to IC10 are the function F10 held by the mobile unit 10.

The functions represented by the icons IC1 to IC10 are categorized into a function G1 executable only in the Bluetooth communication C1, a function G2 executable only in the wireless LAN communication C2, and a function G12 executable in both of the Bluetooth communication C1 and the wireless LAN communication C2, between the mobile unit 10 and the audio apparatus 20. Specifically, the functions represented by the icons IC1 and IC2 are categorized in the function G2 executable only in the wireless LAN communication C2, the functions represented by the icons IC3 to IC6 are categorized in the function G12 executable in both of the Bluetooth communication C1 and the wireless LAN communication C2, and the functions represented by the icons IC7 to IC10 are categorized in the function G1 executable only in the Bluetooth communication C1. The functions represented by the respective icons IC1 to IC10 will be specifically described below.

The function represented by the icon IC1 is a function held by the audio apparatus 20, and in this example, is a function of reproducing music based on the music data recorded in the media server 32. Specifically, when the user selects the function, the mobile unit 10 informs the audio apparatus 20 that the function is selected, through the wireless LAN communication C2. Then, the audio apparatus 20 acquires the music data recorded in the media server 32 through the wireless LAN communication C2, and reproduces the music based on the music data.

The function represented by the icon IC2 is a function held by the audio apparatus 20, and is a function of acquiring music data from the server 34 by download or streaming to reproduce the music. Specifically, when the user selects the function, the mobile unit 10 informs the audio apparatus 20 that the function is selected, through the wireless LAN communication C2. Then, the audio apparatus 20 acquires the music data from the server 34 through the wireless LAN communication C2 by download or streaming, and reproduces the music based on the music data.

The function represented by the icon IC3 is a function held by the audio apparatus 20, and is a function of selecting the tuner 21A as a sound source. The function represented by the icon IC4 is a function held by the audio apparatus 20, and is a function of selecting the USB interface 21B as the sound source. The function represented by the icon 105 is a function held by the audio apparatus 20 and is a function of automatically selecting and reproducing the music data. The icon 106 is a function of selecting the disc drive 21C as the sound source. Specifically, when the user selects any of these functions, the mobile unit 10 informs the audio apparatus 20 that any of these functions is selected, through the Bluetooth communication C1 or the wireless LAN communication C2. Then, the audio apparatus 20 selects the sound source corresponding to any of the functions.

The functions represented by the icons IC7 to IC10 are functions held by the mobile unit 10, and may be functions of allowing the audio apparatus 20 to reproduce music and the like, for example. Specifically, when the user selects any of these functions, the mobile unit 10 informs the audio apparatus 20 that any of these functions is selected, through the Bluetooth communication C1. Then, the mobile unit 10 supplies music data and the like to the audio apparatus 20 through the Bluetooth communication C1, and the audio apparatus 20 then reproduces the music and the like based on the supplied music data and the like.

In this way, the device cooperation software 19 collectively manages the function F10 that allows the audio apparatus 20 to reproduce the music and the like out of the functions held by the mobile unit 10 and the function F20 held by the audio apparatus 20, and displays the icons IC1 to IC10 relating to the functions F10 and F20 in one screen. In other words, the device cooperation software 19 displays the function G1 (the functions represented by the icons IC7 to IC10) executable only in the Bluetooth communication C1, the function G2 (the functions represented by the icons IC1 and IC2) executable only in the wireless LAN communication C2, and the function G12 (the functions represented by the icons IC3 to IC6) executable in both of the Bluetooth communication C1 and the wireless LAN communication C2 on one screen. As a result, in the audio system 1, it is possible to enhance usability of the user.

In other words, when the functions F10 and F20 are collectively managed whereas the icons IC1 to IC10 relating to these functions F10 and F20 are not displayed on one screen, usability of the user may be degraded. Specifically, for example, when the functions are separately managed for each of the communication systems, the user first operates the mobile unit to select the Bluetooth communication C1 or the wireless LAN communication C2, communicates with the audio apparatus, and then selects the function. At this time, for example, when the user selects the Bluetooth communication C1, only the functions executable in the Bluetooth communication C1 are displayed, and the user selects a function to be used from the displayed functions. Moreover, likewise, when the user selects the wireless LAN communication C2, only the functions executable in the wireless LAN communication C2 are displayed, and the user selects a function to be used from the displayed functions. Therefore, it is necessary for the user to be conscious of whether each function is executable in the Bluetooth communication C1 or the wireless LAN communication C2.

Moreover, for example, in the case where the function F10 held by the mobile unit 10 is included in management target and the function F20 held by the audio apparatus 20 is not included in the management target, for example, the user may operate the mobile unit 10 when the function F10 is executed, the user may directly operate the audio apparatus 20 when the function F20 is executed, and the user may operate the mobile unit 10 and the audio apparatus 20 when the network contents are reproduced. In other words, in this case, the device to be operated is changed depending on the functions and contents. Therefore, it is necessary for the user to be conscious that each function is realized by which device and each content is reproduced by which device.

On the other hand, in the audio system 1, the function F10 that allows the audio apparatus 20 to reproduce the music and the like out of the functions held by the mobile unit 10 and the function F20 held by the audio apparatus 20 are collectively managed. Accordingly, the user is allowed to seamlessly operate the audio apparatus 20 without being conscious of the communication system (the Bluetooth communication C1 or the wireless LAN communication C2) between the mobile unit 10 and the audio apparatus 20 and whether the function is held by the mobile unit 10 or the audio apparatus 20, and thus it is possible to enhance usability of the user.

The device cooperation software 19 of the mobile unit 10 acquires the function F20 held by the audio apparatus 20 by performing the Bluetooth communication C1 with the audio apparatus 20, and collectively manages the function F20 and the function F10 held by the mobile unit 10. The acquiring operation of the function F20 by the device cooperation software 19 will be described below.

Figure 5:
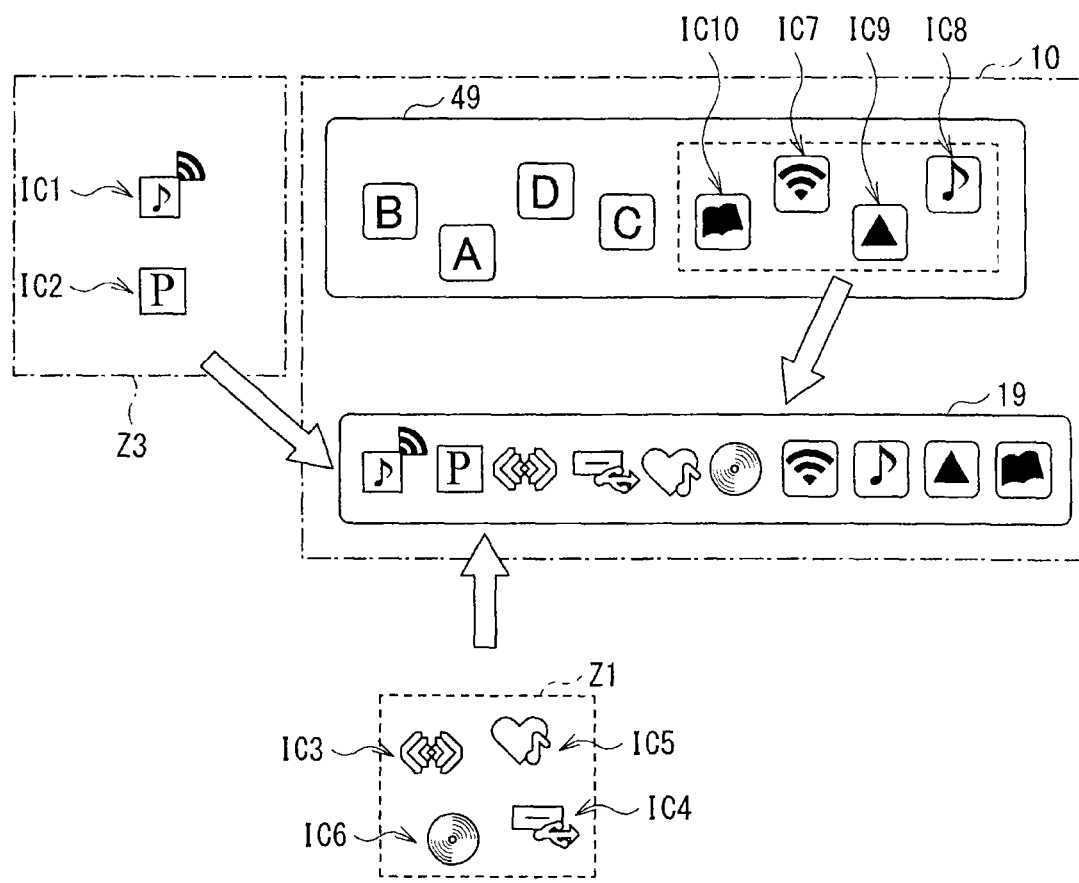
FIG. 5 is an explanatory diagram illustrating an operation example of a control section illustrated in FIG. 2.

FIG. 5 schematically illustrates the operation of the device cooperation software 19. As illustrated in FIG. 5, the device cooperation software 19 acquires the function F10 (the functions relating to the icons IC7 to IC10) that allows the audio apparatus 20 to reproduce music and the like out of the functions held by the mobile unit 10, from a software group 49 of the mobile unit 10. Moreover, from the audio apparatus 20, the device cooperation software 19 acquires, as source information Z1, the function relating to selection of a sound source (the functions relating to the icons IC3 to IC6) out of the function F20 held by the audio apparatus 20, and acquires, as network content information Z3, the function relating to the media server 32 and the server 34 (the functions relating to the icons IC1 and IC2) out of the function F20. Then, the device cooperation software 19 collectively manages these functions.

Next, the operation at the time of starting the communication between the mobile unit 10 and the audio apparatus 20 will be described.

Figure 6:
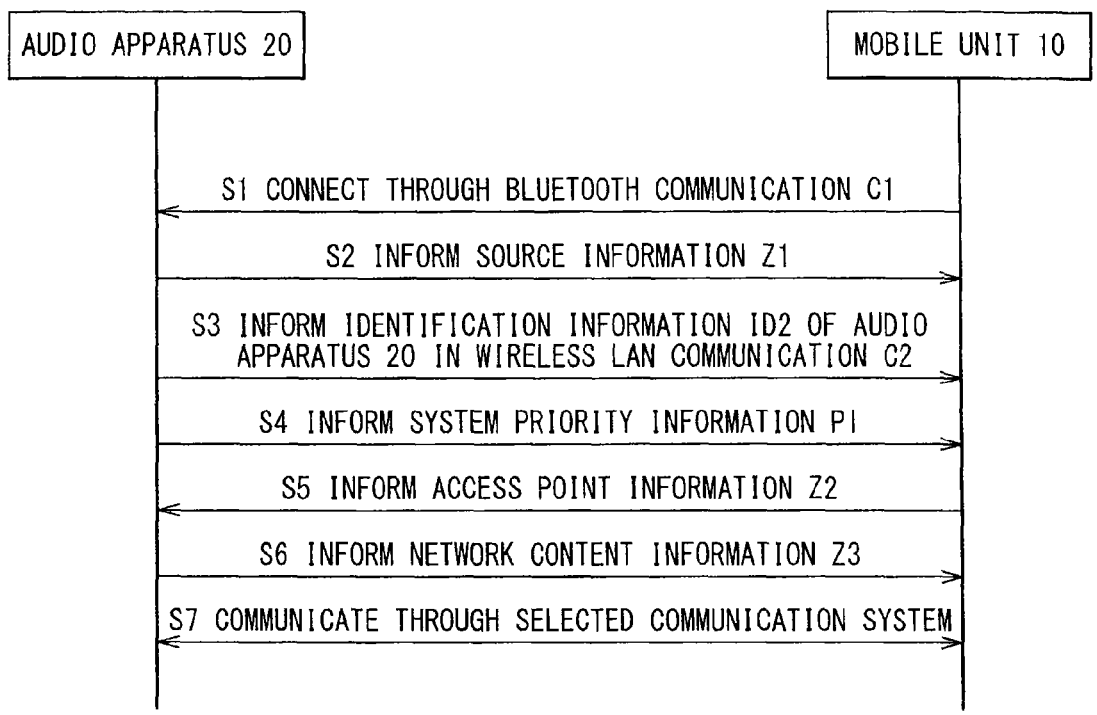
FIG. 6 is a sequence diagram illustrating an operation example of the audio system illustrated in FIG. 1.

FIG. 6 is a sequence diagram of the communication between the mobile unit 10 and the audio apparatus 20. When starting the communication with the audio apparatus 20, the mobile unit 10 first connects to the audio apparatus 20 through the Bluetooth communication C1, and then connects to the audio apparatus 20 through the wireless LAN communication C2 after setting the wireless LAN communication C2 with use of the Bluetooth communication C1. Then, when executing each of the functions, the mobile unit 10 selects the communication system for each of the functions to communicate with the audio apparatus 20. The sequence will be described in detail below.

First, the mobile unit 10 performs a pairing procedure, and connects to the audio apparatus 20 through the Bluetooth communication C1 (at a step S1). Specifically, for example, the Bluetooth communication section 14 of the mobile unit 10 first attempts the Bluetooth communication C1 with electronic apparatuses disposed in the vicinity of the mobile unit 10 to search whether there are electronic apparatuses each capable of performing the Bluetooth communication C1 in the vicinity of the mobile unit 10. Then, the display section 17 of the mobile unit 10 displays a list of electronic apparatuses that are each capable of performing the Bluetooth communication C1. The user selects the audio apparatus 20 from the list of the electronic apparatuses. At this time, the mobile unit 10 acquires identification information ID1 of the audio apparatus 20 in the Bluetooth communication C1. As a result, the mobile unit 10 is allowed to perform the Bluetooth communication C1 on the audio apparatus 20.

Next, the audio apparatus 20 performs the Bluetooth communication C1 on the mobile unit 10 to inform the mobile unit 10 of the source information Z1 (at a step S2). As a result, the device cooperation software 19 of the mobile unit 10 acquires the source information Z1 (the functions relating to the icons IC3 to IC6).

Next, the audio apparatus 20 performs the Bluetooth communication C1 on the mobile unit 10 to inform the mobile unit 10 of identification information ID2 of the audio apparatus 20 in the wireless LAN communication C2 (at a step S3). Then, the mobile unit 10 acquires the identification information ID2 of the audio apparatus 20 in the wireless LAN communication C2. As a result, the control section 18 of the mobile unit 10 determines that the identification information ID1 acquired at the step S1 and the identification information ID2 acquired at the step S3 are the identification information relating to the same audio apparatus 20 (the device name: DevA).

Then, the audio apparatus 20 performs the Bluetooth communication C1 on the mobile unit 10 to inform the mobile unit 10 of system priority information PI (at a step S4). Specifically, the control section 28 of the audio apparatus 20 determines which communication system should be given preference for the functions (for examples, the functions represented by the icons IC3 to IC6) executable in both of the Bluetooth communication C1 and the wireless LAN communication C2. Specifically, for example, the control section 28 determines that the wireless LAN communication C2 at high communication speed should be given preference because the audio apparatus 20 is of a stationary type and receives power from an AC power source. Moreover, for example, in the case where the audio apparatus 20 has a battery, the control section 28 may determine that the wireless LAN communication C2 at high communication speed should be given preference when the power is supplied from the AC power source, and may determine that the Bluetooth communication C1 with low power consumption should be given preference when the power is supplied from the battery. Further, in the case where the power is supplied from the battery, the control section 28 may determine that the wireless LAN communication C2 should be given preference when the remaining capacity of the battery is large, and may determine that the Bluetooth communication C1 should be given preference when the remaining capacity of the battery is small. In this way, the audio apparatus 20 determines which communication system should be given preference in consideration of circumstances specific to the audio apparatus 20. Then, the audio apparatus 20 informs the mobile unit 10 of the communication system determined in such a way, as the system priority information P1.

Next, the mobile unit 10 performs the Bluetooth communication C1 on the audio apparatus 20 to inform the audio apparatus 20 of access point information Z2 (at a step S5). Specifically, the mobile unit 10 informs the audio apparatus 20 of identification information (SSID) and a cryptography key (key) of the access point 31, as the access point information Z2. In other words, when the communication setting of the mobile unit 10 itself to the access point 31 is completed, the mobile unit 10 already has the identification information (SSID) and the cryptography key (key), and thus the mobile unit 10 informs the audio apparatus 20 of the information. In response thereto, the audio apparatus 20 acquires the access point information Z2 and connects to the access point 31 through the wireless LAN communication C2. As a result, the audio apparatus 20 connects to the mobile unit 10 via the access point 31 through the wireless LAN communication C2.

Incidentally, in this example, the mobile unit 10 informs the audio apparatus 20 of the identification information (SSID) and the cryptography key (key) that are already held by the mobile unit 10; however, this is not limitative. Alternatively, for example, the mobile unit 10 may cause the user to input the cryptography key (key), and then may inform the audio apparatus 20 of the identification information (SSID) and the cryptography key (key) input by the user. As a result, it is possible to enhance safety of the network communication.

Next, the audio apparatus 20 performs the wireless LAN communication C2 on the mobile unit 10 to inform the mobile unit 10 of the network content information Z3 (at a step S6). As a result, the device cooperation software 19 of the mobile unit 10 acquires the network content information Z3 (the functions relating to the icons IC1 and IC2).

Then, the mobile unit 10 and the audio apparatus 20 perform mutual communication (at a step S7). Specifically, the control section 18 of the mobile unit 10 displays the display screen P1 illustrated in FIG. 4, on the display section 17. Then, the user selects one of the displayed functions (icons). After that, the mobile unit 10 and the audio apparatus 20 perform mutual communication based on the function selected by the user. At this time, the control section 18 of the mobile unit 10 selects the communication system for each function to communicate with the audio apparatus 20. Specifically, when any of the functions executable only in the Bluetooth communication C1 (for example, the functions represented by the icons IC7 to IC10) is executed, the control section 18 selects the Bluetooth communication C1. Moreover, when any of the functions executable only in the wireless LAN communication C2 (for example, the functions represented by the icons IC1 and IC2) is executed, the control section 18 selects the wireless LAN communication C2. Further, when any of the functions executable in both of the Bluetooth communication C1 and the wireless LAN communication C2 (for example, the functions represented by the icons IC3 to IC6) is executed, the control section 18 determines the communication system based on the system priority information PI supplied from the audio apparatus 20 and the circumstances of the mobile unit 10. Specifically, for example, when the remaining capacity of the battery of the mobile unit 10 is large, the control section 18 selects the communication system indicated by the system priority information PI, and when the remaining capacity of the battery is small, the control section 18 selects the Bluetooth communication C1. Moreover, for example, when the communication environment between the wireless LAN communication section 15 and the access point 31 is poor and the reception sensitivity is low, the control section 18 selects the Bluetooth communication C1.

As described above, in the audio system 1, as for the functions executable in both of the Bluetooth communication C1 and the wireless LAN communication C2 (for example, the functions represented by the icons IC3 to IC6), the control section 18 of the mobile unit 10 determines the communication system based on the system priority information PI supplied from the audio apparatus 20. Accordingly, in the audio system 1, the communication system is allowed to be determined in consideration of both of the circumstances of the audio apparatus 20 and the circumstances of the mobile unit 10. In other words, for example, when the control section of the mobile unit determines the communication system without using the system priority information PI, the control section of the mobile unit determines the communication system only in consideration of the circumstances of the mobile unit without considering the circumstances of the audio apparatus. Therefore, for example, in the case where the audio apparatus has a battery, the wireless LAN communication C2 is selected in spite of small remaining capacity of the battery, and therefore the battery drive time may become short. On the other hand, in the audio system 1, the audio apparatus 20 informs the mobile unit 10 of the system priority information PI, and the control section 18 of the mobile unit 10 determines the communication system based on the system priority information PI. Therefore, the mobile unit 10 is allowed to determine the communication system in consideration of both of the circumstances of the audio apparatus 20 and the circumstances of the mobile unit 10, which makes it possible to perform communication through desirable communication system. As a result, it is unnecessary for the user to be conscious of the circumstances of the audio apparatus 20 and the circumstances of the mobile unit 10, which makes it possible to enhance usability of the user.

Moreover, in the audio system 1, the mobile unit 10 acquires the identification information ID1 of the audio apparatus 20 in the Bluetooth communication C1 at the step S1, and acquires the identification information ID2 of the audio apparatus 20 in the wireless LAN communication C2 at the step S3. Accordingly, the mobile unit 10 is allowed to determine that the identification information ID1 and ID2 different from each other are identification information relating to the same audio apparatus 20 (the device name: DevA). As a result, the mobile unit 10 is allowed to collectively manage the function G1 executable only in the Bluetooth communication C1 (for example, the functions represented by the icons IC7 to IC10), the function G12 executable in both of the Bluetooth communication C1 and the wireless LAN communication C2 (for example, the functions represented by the icons IC3 to IC6), and the function G2 executable only in the wireless LAN communication C2 (for example, the functions represented by the icons IC1 and IC2), and to display them on one screen as with the display screen P1 (FIG. 4).

Further, in the audio system 1, the mobile unit 10 informs the audio apparatus 20 of the access point information Z2 at the step S5. Therefore, it is possible to enhance usability of a user. Specifically, for example, when the mobile unit does not inform the audio apparatus of the access point information, it is necessary for the user to perform communication setting of the audio apparatus to the access point 31 by any way. For example, when the user directly performs the communication setting on the audio apparatus, it is necessary to provide a user interface for the setting in the audio apparatus, and it is necessary for the user to input the identification information (SSID) and the cryptography key (key), which takes time and labor. Moreover, for example, also when the audio apparatus is operated temporarily as an access point and communication setting of the audio apparatus to the access point 31 is performed by the wireless LAN communication with the audio apparatus from a PC, it is necessary for the user to input the identification information (SSID) and the cryptography key (key), which takes time and labor. On the other hand, in the audio system 1, the mobile unit 10 informs the audio apparatus 20 of the access point information Z2, and the audio apparatus 20 performs the communication setting to the access point 31 based on the access point information Z2. As a result, it is unnecessary for the user to input the identification information (SSID) and the cryptography key (key), and the user poor in knowledge of the network is allowed to easily perform the communication setting, which makes it possible to enhance usability of the user.

[Effects]

As described above, in the present embodiment, as for the functions executable in both of the Bluetooth communication and the wireless LAN communication, the control section of the mobile unit determines the communication system based on the priority information supplied from the audio apparatus. This makes it possible to select the communication system in consideration of both of the circumstances of the audio apparatus and the circumstances of the mobile unit. Accordingly, it is possible to select the desirable communication system.

In the present embodiment, the function of allowing the audio apparatus to reproduce music and the like out of the functions held by the mobile unit and the functions held by the audio apparatus are collectively managed, and the icons relating to these functions are displayed on one screen. This makes it possible to enhance usability of the user.

In the present embodiment, the mobile unit informs the audio apparatus of the access point information. Therefore, it is unnecessary for the user to input the identification information (SSID) and the like, which makes it possible to enhance usability of the user.

[Modification 1]

Figure 7:
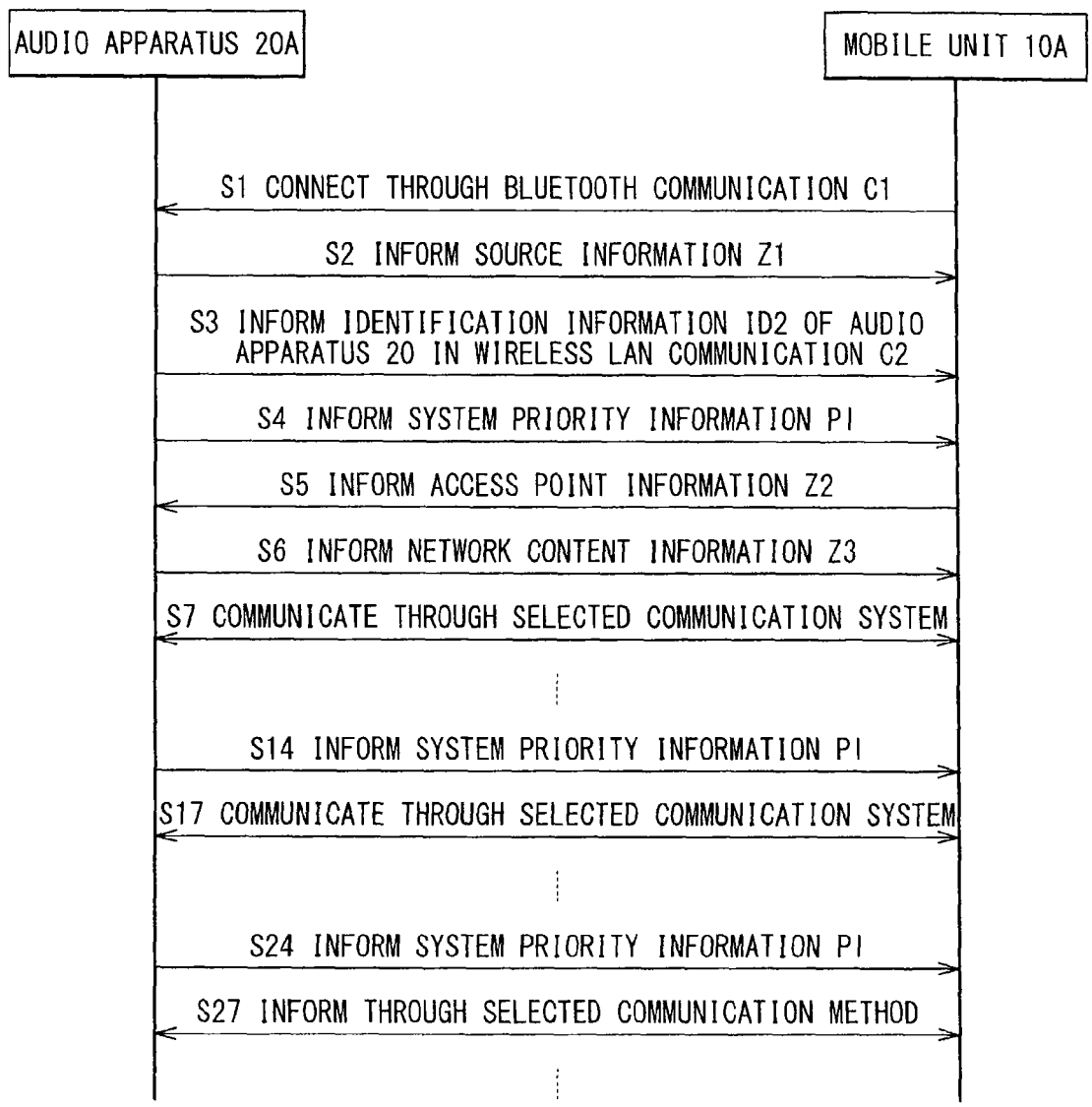
FIG. 7 is a sequence diagram illustrating an operation example of an audio system according to a modification.

In the above-described embodiment, as illustrated in FIG. 6, when the mobile unit 10 starts the communication with the audio apparatus 20, the audio apparatus 20 informs the mobile unit 10 of the system priority information PI. However, this is not limitative, and alternatively, for example, as with an audio system 1A illustrated in FIG. 7, an audio apparatus may intermittently inform a mobile unit of the system priority information PI even after that. An audio apparatus 20A of the audio system 1A intermittently informs a mobile unit 10A of the system priority information PI (at steps S14 and S24). As a result, in the audio system 1A, when the circumstances of the audio apparatus 20A are changed, it is possible to perform communication through the desirable communication system corresponding to the circumstances. Specifically, for example, in the case where the wireless LAN communication C2 is selected in first communication S7, when the communication environment between the audio apparatus 20A and the access point 31 is poor and the reception sensitivity is low, a control section 28A of the audio apparatus 20A determines that the Bluetooth communication C1 should be given preference, and may inform the mobile unit 10A of the system priority information PI at the step S14. Moreover, for example, in the case where the audio apparatus 20A has a battery, when the remaining capacity of the battery is large at the start of the communication and then the remaining capacity of the battery is decreased by the communication, the control section 28A of the audio apparatus 20A is allowed to determine that the Bluetooth communication C1 with low power consumption should be given preference again in order to suppress decrease of the remaining capacity of the battery.

[Modification 2]

Figure 8:
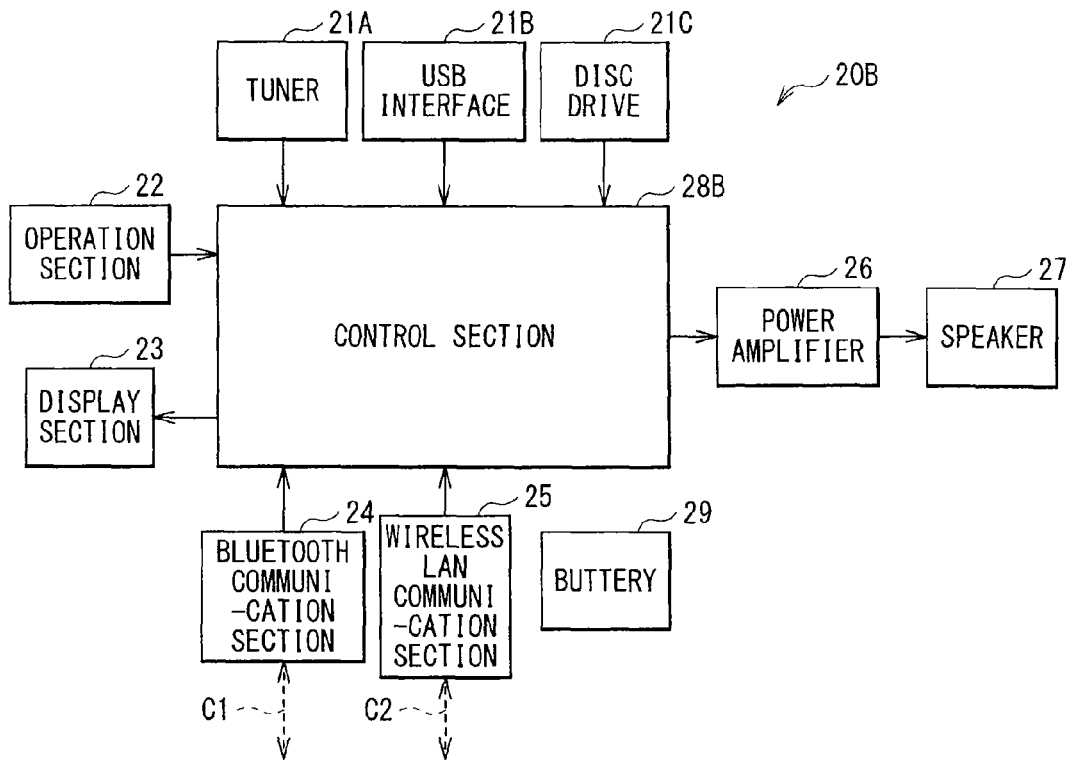
FIG. 8 is a block diagram illustrating a configuration example of an audio apparatus according to another modification.

In the above-described embodiment, the stationary type audio apparatus 20 is used; however, this is not limitative. Alternatively, for example, as illustrated in FIG. 8, a portable audio apparatus 20B having a battery 29 may be used. In this case, for example, a control section 28B of the audio apparatus 20B determines that the Bluetooth communication C1 with low power consumption should be given preference in order to suppress decrease of the remaining capacity of the battery. In this way, in the present technology, the system priority information PI is allowed to be generated depending on whether the audio apparatus is of the stationary type (the audio apparatus 20) or of the portable type (the audio apparatus 20B). As a result, the user is allowed to determine the communication system desirable for the mobile unit 10 without being conscious of the characteristics of the communication partner (in this example, the audio apparatus).

[Modification 3]

Figure 9:
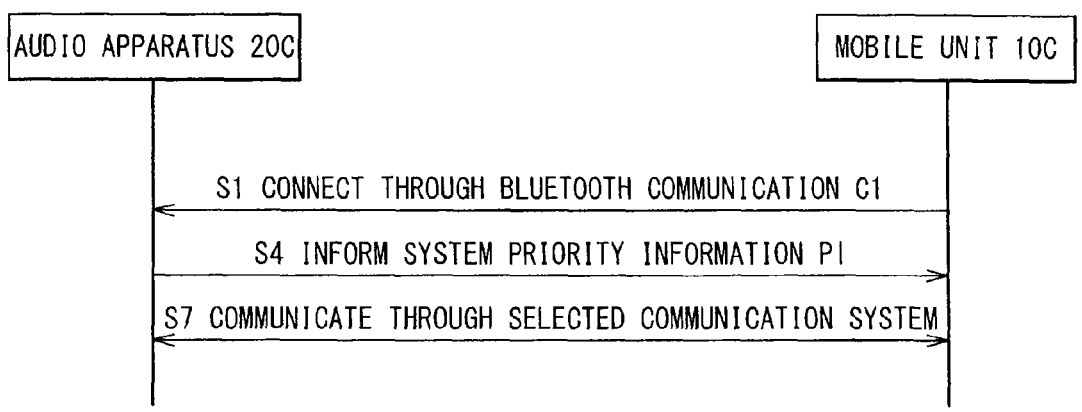
FIG. 9 is a sequence diagram illustrating an operation example of an audio system according to still another modification.

In the above-described embodiment, the communication is performed in the sequence illustrated in FIG. 6 every time the mobile unit 10 communicates with the audio apparatus 20; however, this is not limitative. Alternatively, for example, as with an audio system 1C illustrated in FIG. 9, when the second and subsequent communication start, the communication is performed in more simplified sequence. In the audio system 1C, when the second and subsequent communication start, first, a mobile unit 10C performs a pairing procedure, and connects to an audio apparatus 20C through the Bluetooth communication C1 (at the step S1). Then, the audio apparatus 20C informs the mobile unit 10C of the system priority information PI (at the step S4), and then, the mobile unit 10C and the audio apparatus 20C perform mutual communication (at the step S7). Specifically, the steps S2, S3, S5, and S6 (FIG. 6) has been performed in the past, these steps are omitted at the start of the second and subsequent communication. In other words, at the start of the second and subsequent communication, the functions F10 and F20 are displayed as the icons IC1 to IC10 on a display section 17 of the mobile unit 10C even without performing these steps, as with the display screen P1 illustrated in FIG. 4.

[Modification 4]

Figure 10:
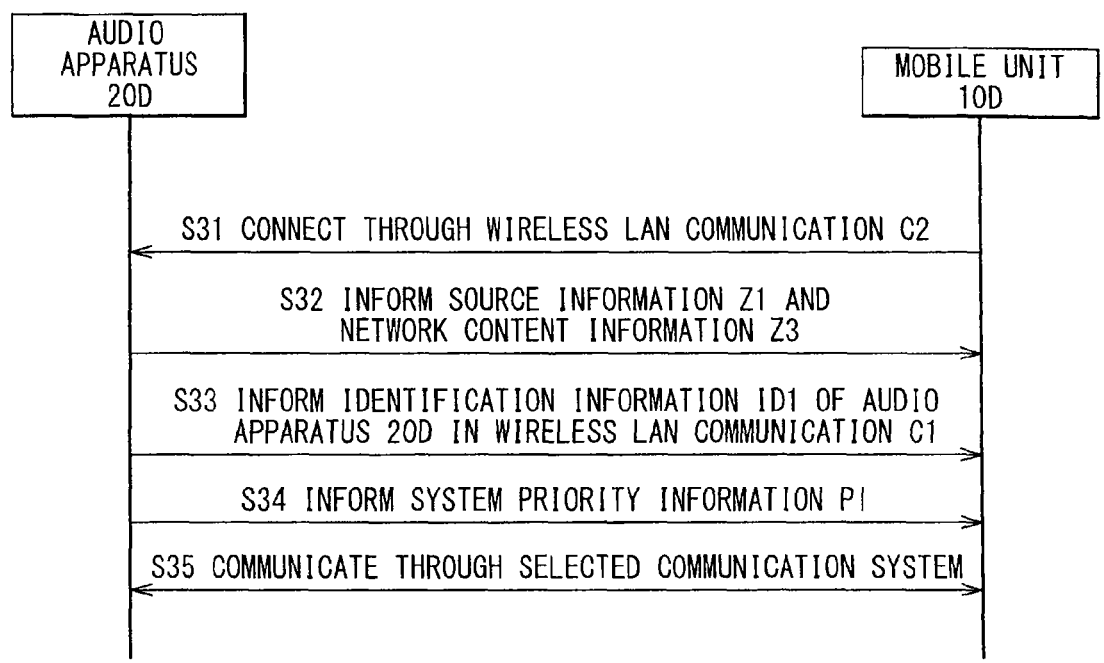
FIG. 10 is a sequence diagram illustrating an operation example of an audio system according to still another modification.

In the above-described embodiment, at the start of communication with the audio apparatus 20, the mobile unit 10 first connects to the audio apparatus 20 through the Bluetooth communication C1, and then connects to the audio apparatus 20 through the wireless LAN communication C2 after performing the setting of the wireless LAN communication C2 with use of the Bluetooth communication C1. However, this is not limitative. Alternatively, for example, as with an audio system 1D illustrated in FIG. 10, the mobile unit first connects to the audio apparatus 20 through the wireless LAN communication C2, and then connects to the audio apparatus 20 through the Bluetooth communication C1 after performing the setting of the Bluetooth communication C1 with use of the wireless LAN communication C2. In the audio system 1D, first, a mobile unit 10D connects to an audio apparatus 20D through the wireless LAN communication C2 (at a step S31). Then, the audio apparatus 20D performs the wireless LAN communication C2 on the mobile unit 10D to inform the mobile unit 10D of the source information Z1 and the network content information Z3 (at a step S32). Then, the audio apparatus 20D performs the wireless LAN communication C2 on the mobile unit 10D to inform the mobile unit 10D of the identification information ID1 of the audio apparatus 20D in the Bluetooth communication C1 (at a step S33). Next, the audio apparatus 20D performs the wireless LAN communication C2 on the mobile unit 10D to inform the mobile unit 10D of the system priority information PI (at a step S34). After that, the mobile unit 10D and the audio apparatus 20D perform mutual communication (at a step S35). At this time, the mobile unit 10D selects the communication system for each function to communicate with the audio apparatus 20D, similarly to the mobile unit 10 according to the above-described embodiment.

[Modification 5]

In the above-described embodiment, one mobile unit 10 is used. However, the number of mobile units is not limited thereto, and alternatively, for example, a plurality of mobile units may be used. An audio system 1E using two mobile units will be described in detail below.

Figure 11:
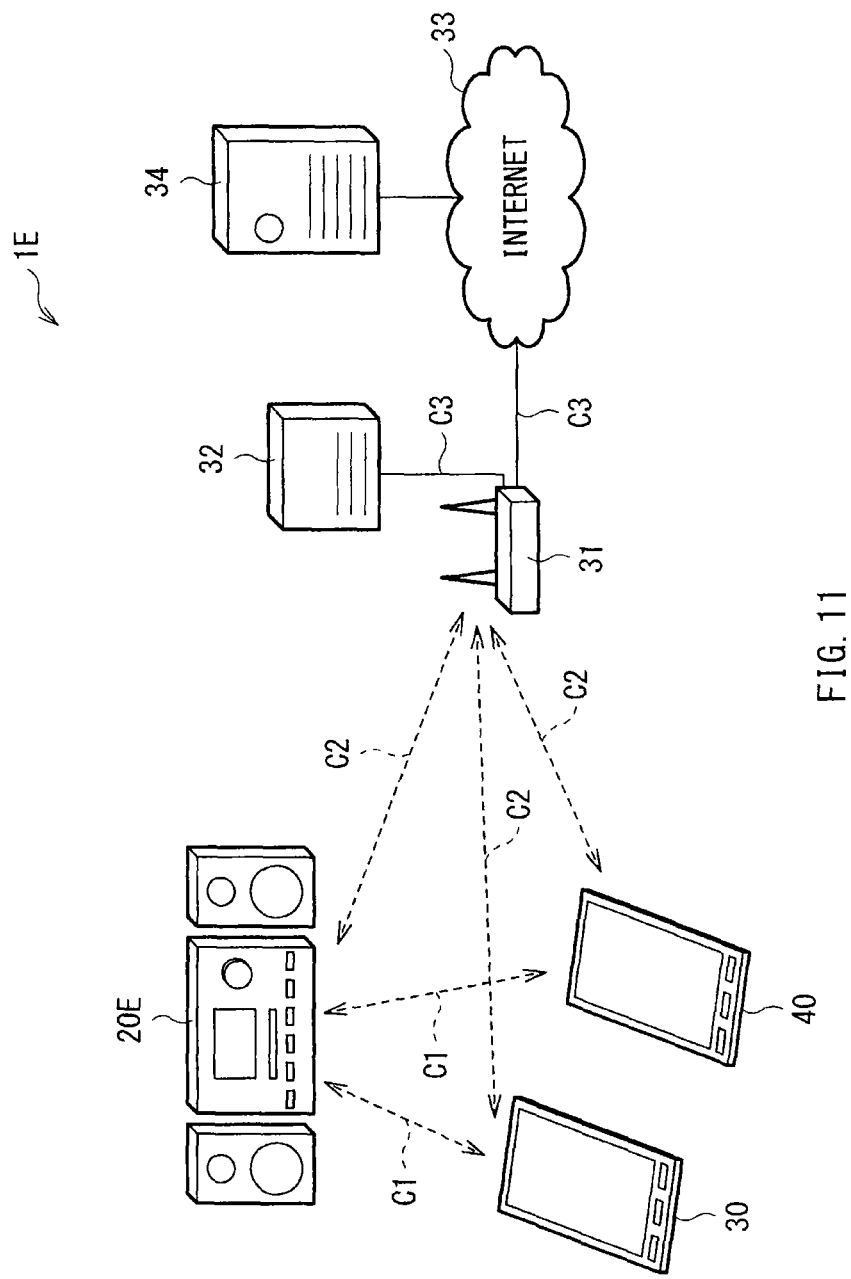
FIG. 11 is an explanatory diagram illustrating a configuration example of an audio system according to still another modification.

FIG. 11 illustrates a configuration example of the audio system 1E. The audio system 1E includes two mobile units 30 and 40 and an audio apparatus 20E. The mobile units 30 and 40 each have a configuration similar to that of the mobile unit 10 according to the above-described embodiment. The audio apparatus 20E has a configuration similar to that of the audio apparatus 20 according to the above-described embodiment, and is communicable with the two mobile units 30 and 40.

Figure 12:
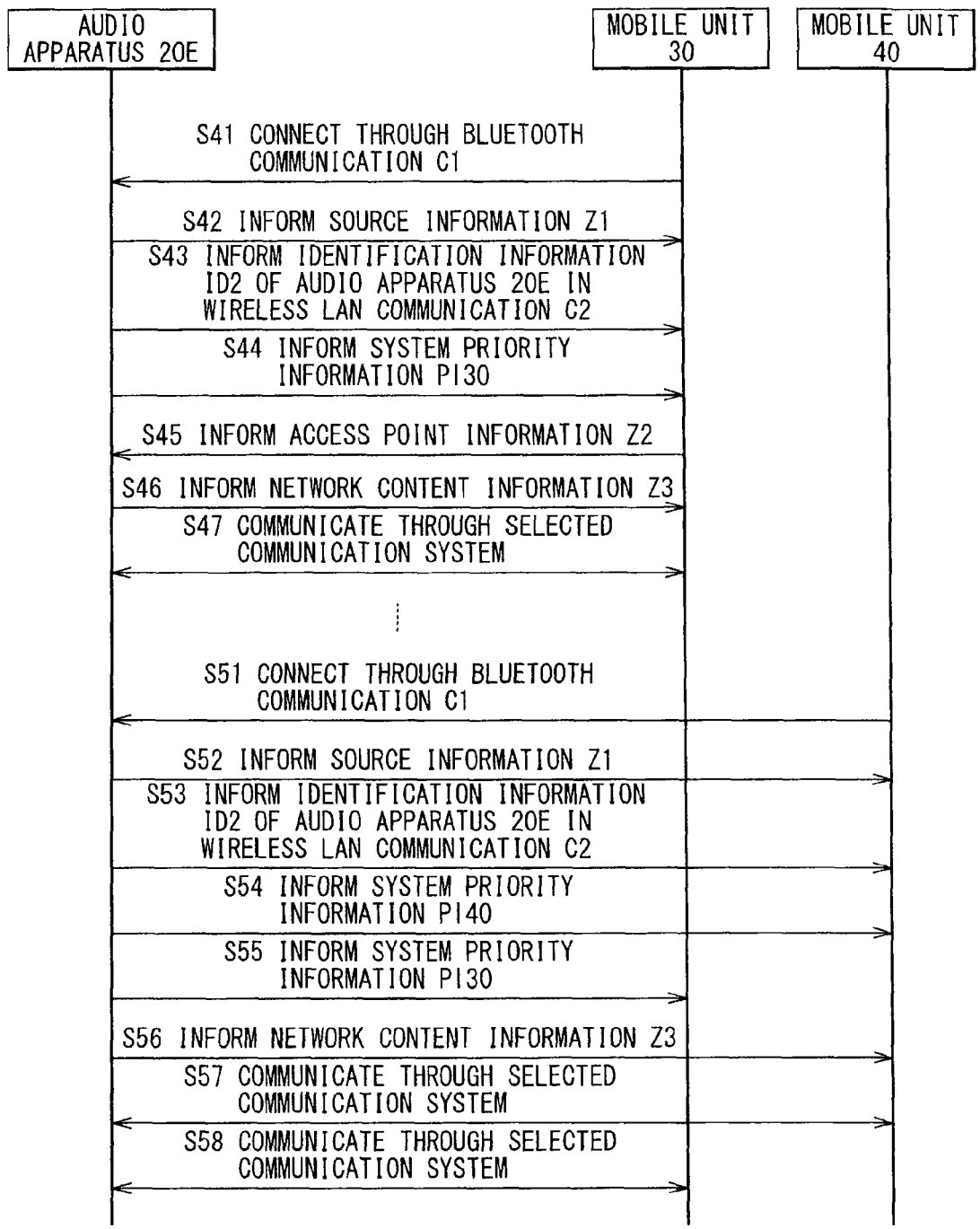
FIG. 12 is a sequence diagram illustrating an operation example of the audio system illustrated in FIG. 10.

FIG. 12 is a sequence diagram of the communication between the mobile units 30 and 40 and the audio apparatus 20E. In this example, first, the mobile unit 30 starts communication with the audio apparatus 20E, and the mobile unit 40 then starts communication with the audio apparatus 20E. The sequence will be described in detail below.

The mobile unit 30 performs, at steps S41 to S46, a procedure similar to that at the steps S1 to S6 according to the above-described embodiment, and starts communication with the audio apparatus 20E at a step S47.

Then, the mobile unit 40 performs a pairing procedure, and connects to the audio apparatus 20E through the Bluetooth communication C1 (at a step S51). Then, the audio apparatus 20E performs the Bluetooth communication C1 on the mobile unit 40 to inform the mobile unit 40 of the source information Z1 (at a step S52). Next, the audio apparatus 20E performs the Bluetooth communication C1 on the mobile unit 40 to inform the mobile unit 40 of the identification information ID2 of the audio apparatus 20E in the wireless LAN communication C2 (at a step S53).

Next, the audio apparatus 20E performs the Bluetooth communication C1 on the mobile unit 40 to inform the mobile unit 40 of system priority information PI (PI40) (at a step S54), and performs the Bluetooth communication C1 on the mobile unit 30 to inform the mobile unit 30 of system priority information PI (PI30) (at a step S55). Specifically, a control section 28E of the audio apparatus 20E determines which communication system should be given preference for the functions executable in both of the Bluetooth communication C1 and the wireless LAN communication C2, for each of the mobile units 30 and 40. Specifically, the control section 28E may determine that the wireless LAN communication C2 should be given preference for both of the mobile units 30 and 40 in consideration of the fact that the audio apparatus 20E communicates with the two mobile units 30 and 40. Moreover, for example, when notification that the Bluetooth communication C1 is desired to be used is given from the mobile unit 30, the control section 28E may determine that the Bluetooth communication C1 should be given preference with the mobile unit 30, and may determine that the wireless LAN communication C2 should be given preference with the mobile unit 40.

Then, the audio apparatus 20E performs the wireless LAN communication C2 on the mobile unit 40 to inform the mobile unit 40 of the network content information Z3 (at a step S56). Incidentally, in this example, the mobile unit 40 does not inform the audio apparatus 20E of the access point information Z2 before the step S56. This is because the audio apparatus 20E already acquires the access point information Z2 at the step S45, and performs the wireless LAN communication C2 to the access point 31.

Then, the mobile unit 40 and the audio apparatus 20E perform mutual communication (at a step S57), and the mobile unit 30 and the audio apparatus 20E perform mutual communication (at a step S58). At this time, the mobile units 30 and 40 each select the communication system for each function to communicate with the audio apparatus 20E, similarly to the mobile unit 10 according to the above-described embodiment.

[Modification 6]

In the above-described embodiment, one audio apparatus 20 is used. However, the number of audio apparatuses is not limited thereto, and alternatively, for example, a plurality of audio apparatuses may be used. An audio system 1E using two audio apparatuses will be described in detail below.

Figure 13:
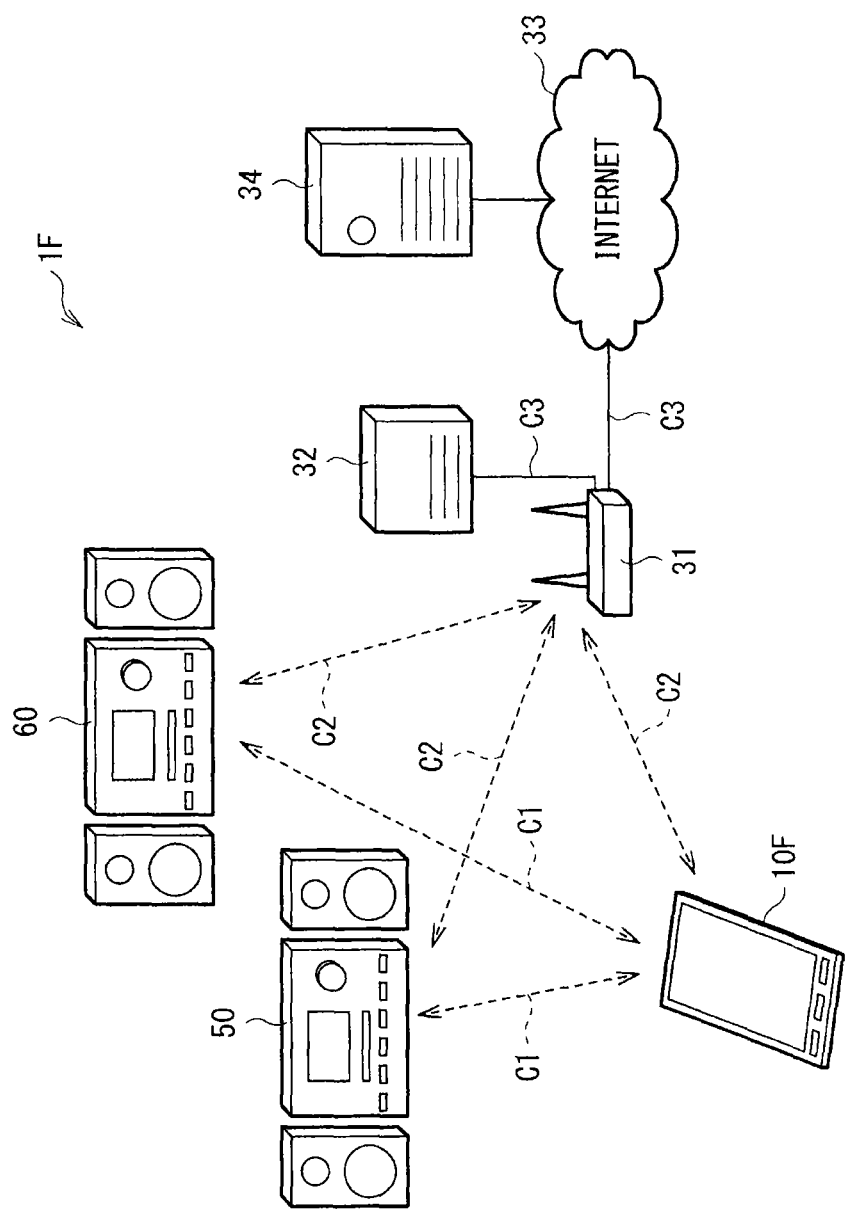
FIG. 13 is an explanatory diagram illustrating a configuration example of an audio system according to still another modification.

FIG. 13 illustrates a configuration example of an audio system 1F. The audio system 1F includes a mobile unit 10F and two audio apparatuses 50 and 60. The mobile unit 10F has a configuration similar to that of the mobile unit 10 according to the above-described embodiment, and is communicable with the two audio apparatuses 50 and 60. The audio apparatuses 50 and 60 each have a configuration similar to that of the audio apparatus 20 according to the above-described embodiment.

Figure 14:
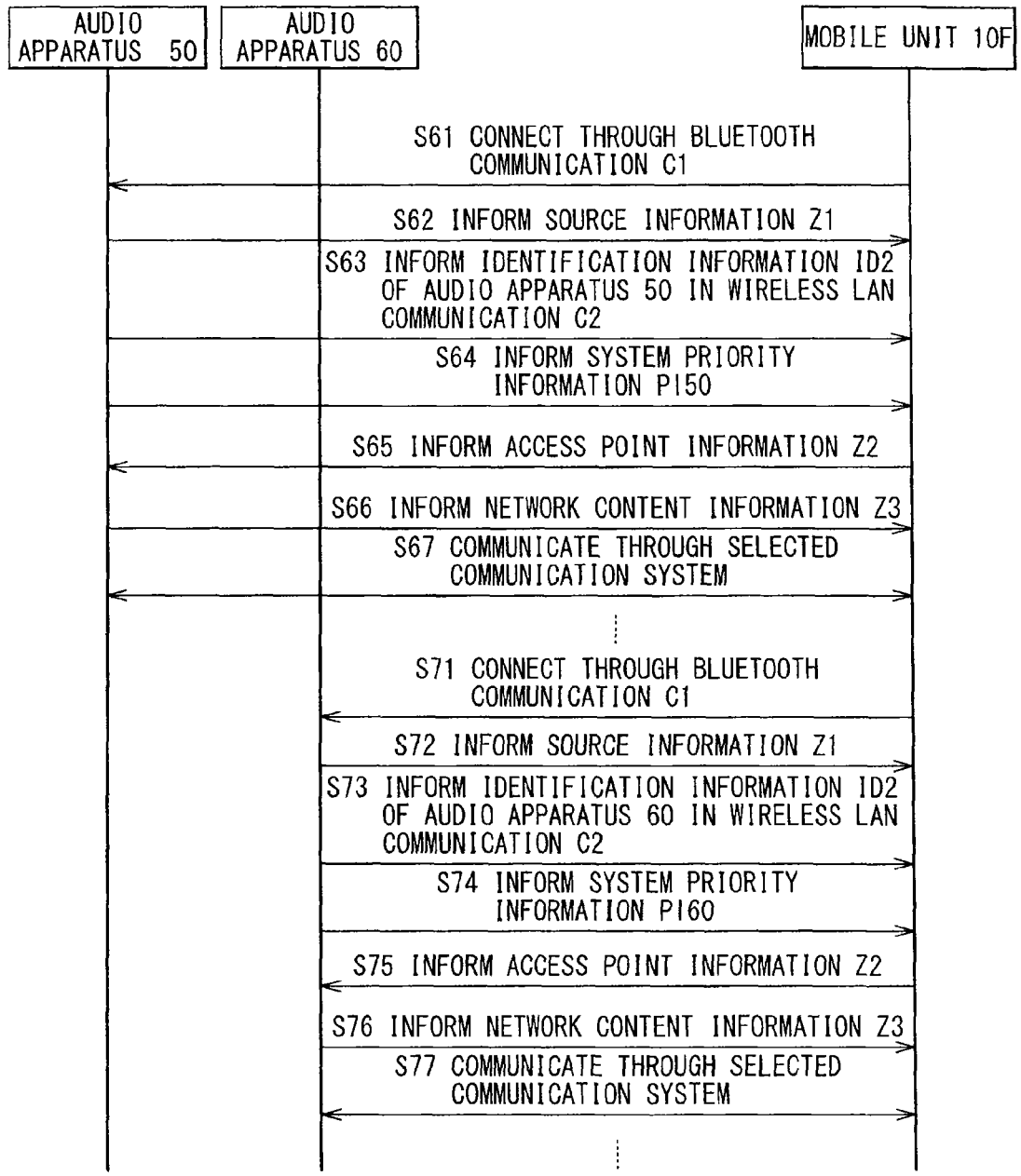
FIG. 14 is a sequence diagram illustrating an operation example of the audio system illustrated in FIG. 13.

FIG. 14 is a sequence diagram of the communication between the mobile unit 10F and the audio apparatuses 50 and 60. The mobile unit 10F performs, at steps S61 to S66, a procedure similar to that at the steps S1 to S6 according to the above-described embodiment, with the audio apparatus 50, and starts the communication at a step S67. At this time, the mobile unit 10F selects the communication system for each function similarly to the mobile unit 10 according to the above-described embodiment, and communicates with the audio apparatus 50. After that, the mobile unit 10F performs, at steps S71 to S76, a procedure similar to that at the steps S1 to S6 according to the above-described embodiment, with the audio apparatus 60, and starts the communication at a step S77. At this time, the mobile unit 10F selects the communication system for each function similarly to the mobile unit 10 according to the above-described embodiment, and communicates with the audio apparatus 60.

Figure 15:
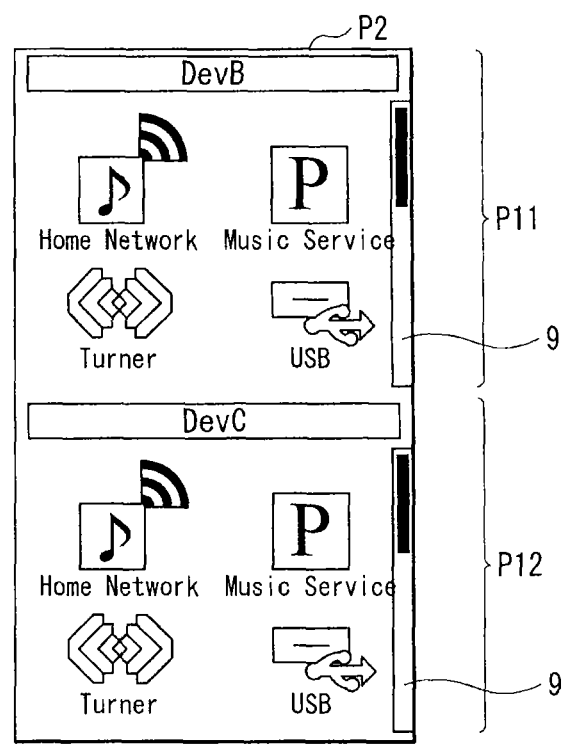
FIG. 15 is an image diagram illustrating an example of a display screen of a mobile unit illustrated in FIG. 13.

FIG. 15 illustrates an example of a display screen P2 displayed on the display section 17 when the device cooperation software 19 of the mobile unit 10F is executed. The display screen P2 is segmented into two segments P11 and P12. Further, the functions of the audio apparatus 50 (the device name: DevB) are displayed in the segment P11, and the functions of the audio apparatus 60 (the device name: DevC) are displayed in the segment P12. Incidentally, in each of the segments P11 and P12, a scroll bar 9 is provided, and the scroll bar 9 is operated to allow all of the functions to be displayed.

Figure 16A:
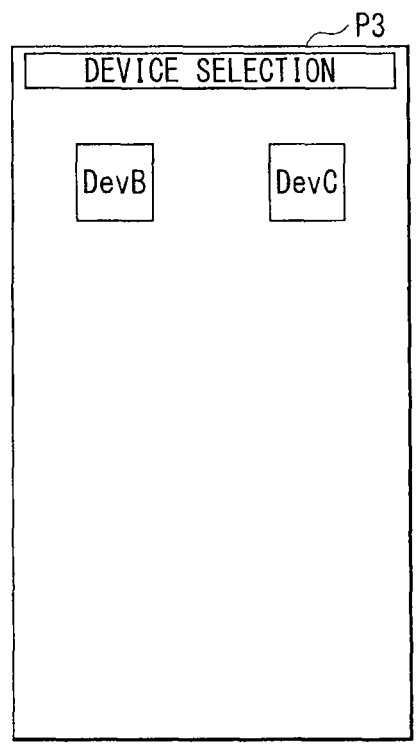
FIG. 16A is an image diagram illustrating another example of the display screen of the mobile unit illustrated in FIG. 13.
Figure 16B:
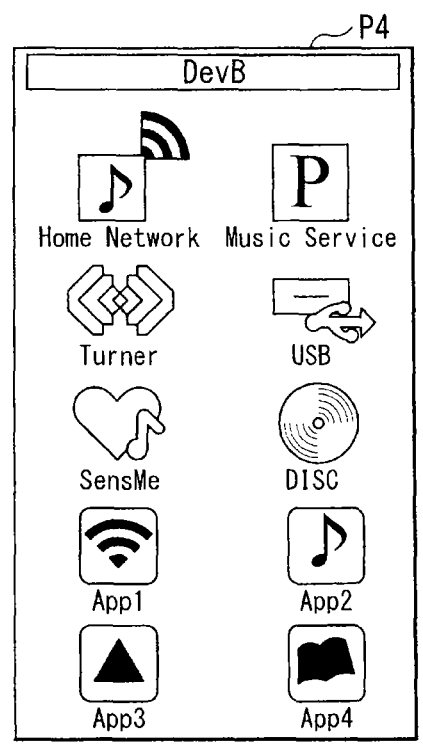
FIG. 16B is an image diagram illustrating still another example of the display screen of the mobile unit illustrated in FIG. 13.

Incidentally, in this example, both of the functions of the audio apparatus 50 (the device name: DevB) and the functions of the audio apparatus 60 (the device name: DevC) are displayed in one screen. However, this is not limitative, and as illustrated in FIG. 16A, one of the audio apparatus 50 (the device name: DevB) and the audio apparatus 60 (the device name: DevC) is selected, and the functions of the selected unit may be displayed as illustrated in FIG. 16B.

[Modification 7]

In the above-described embodiment, the mobile unit 10 controls the audio apparatus 20. However, this is not limitative, and alternatively, for example, the audio system may include a plurality of operation modes M1 and M2, the mobile unit 10 may control the audio apparatus 20 in the operation mode M1, and the audio apparatus 20 may control the mobile unit 10 in the operation mode M2.

[Other Modifications]

In addition, two or more of the above-described modifications may be combined.

Hereinbefore, although the technology has been described with referring to the embodiment and the modifications, the technology is not limited to the embodiment and the like, and various modifications may be made.

For example, in the above-described embodiment, music data is mainly handled. However, the data to be handled is not limited thereto, and various kinds of data such as photograph data and picture data may be handled.

Incidentally, the effects described in the present specification are merely examples without limitation, and other effects may be obtained.

Note that the present technology may be configured as follows.

(1) A controller including:

a communication section configured to be selectively communicable with an electronic apparatus through a first communication system or a second communication system, and configured to acquire system priority information from the electronic apparatus by communicating with the electronic apparatus through the first communication system, the electronic apparatus being capable of executing one or a plurality of functions; and a control section configured to select one of the first communication system and the second communication system, based on the system priority information, and configured to instruct the communication section to communicate with the electronic apparatus through the selected communication system.

(2) The controller according to (1), wherein the one or the plurality of functions each correspond to one or both of the first communication system and the second communication system, and the control section receives instruction information instructing a function, and the control section selects the corresponding communication system when a first function corresponded to one of the first communication system and the second communication system is instructed, and the control section selects one of the first communication system and the second communication system based on the system priority information when a second function corresponded to both of the first communication system and the second communication system is instructed.

(3) The controller according to (2), wherein the control section controls a display section to display a first icon corresponded to the first function and a second icon corresponded to the second function, in one screen.

(4) The controller according to (2) or (3), wherein the first communication system is a short-distance wireless communication system, the second communication system is a network communication system, and the function corresponded to the second communication system is a function to control a server connected to a network.

(5) The controller according to any one of (1) to (3), wherein the first communication system is a network communication system, and the second communication system is a short-distance wireless communication system.

(6) The controller according to any one of (1) to (5), wherein

The communication section is further configured to be selectively communicable with another electronic apparatus through the first communication system or the second communication system, and configured to acquire another system priority information from the another electronic apparatus by communicating with the another electronic apparatus through the first communication system, the another electronic apparatus being capable of executing one or a plurality of functions, the control section selects one of the first communication system and the second communication system, based on the another system priority information, and instructs the communication system to communicate with the another electronic apparatus through the selected communication system, and the control section controls a display section to display one or a plurality of icons corresponded to the respective functions of the electronic apparatus and one or a plurality of icons corresponded to respective functions of the another electronic apparatus, in one screen.

(7) The controller according to any one of (1) to (6), wherein the communication section communicates with the electronic apparatus through the first communication system to acquire identification information of the electronic apparatus in the second communication system.

(8) The controller according to any one of (1) to (7), wherein the communication section communicates with the electronic apparatus through the first communication system to supply communication setting information in the second communication system to the electronic apparatus.

(9) The controller according to any one of (1) to (8), wherein the control section selects one of the first communication system and the second communication system, based on a device state or a device environment of the controller, in addition to the system priority information.

(10) An electronic apparatus including:

a communication section configured to be selectively communicable with a controller through a first communication system or a second communication system, and configured to communicate with the controller through the first communication system to supply system priority information to the controller; and a processing section configured to be capable of executing one or a plurality of functions, and configured to generate the system priority information.

(11) The electronic apparatus according to (10), wherein the processing section generates the system priority information, based on a device state or a device environment of the electronic apparatus.

(12) The electronic apparatus according to (11), wherein the device state is a state of charge of a battery or a power supplied state indicating that power is supplied from which of the battery and an AC power source.

(13) The electronic apparatus according to (11) or (12), wherein the device environment is a communication environment by the first communication system or the second communication system.

(14) The electronic apparatus according to any one of (10) to (13), wherein the processing section intermittently generates the system priority information.

(15) The electronic apparatus according to any one of (10) to (14), wherein the communication section is further configured to be communicable with another controller selectively through the first communication system or the second communication system, and configured to communicate with the another controller through the first communication system to supply another system priority information to the another controller, and the processing section generates the another system priority information.

(16) A control system provided with a controller and an electronic apparatus, the controller including a first communication section configured to be selectively communicable with the electronic apparatus through a first communication system or a second communication system, and configured to communicate with the electronic apparatus through the first communication system to acquire system priority information from the electronic apparatus, and a control section configured to select one of the first communication system and the second communication system, based on the system priority information, and configured to instruct the first communication section to communicate with the electronic apparatus through the selected communication system, and the electronic apparatus including a second communication section configured to be selectively communicable with the controller through the first communication system or the second communication system, and configured to communicate with the controller through the first communication system to supply the system priority information to the controller, and a processing section configured to be capable of executing one or a plurality of functions, and configured to generate the system priority information.

(17) A control method including:
allowing an electronic apparatus to generate system priority information and to supply the system priority information to a controller through a first communication system, the electronic apparatus being configured to selectively communicable with the controller through the first communication system or a second communication system;
allowing the controller to select one of the first communication system and the second communication system based on the system priority information, and to communicate with the electronic apparatus through the selected communication system; and
allowing the electronic apparatus to execute one or a plurality of functions in response to the communication with the controller.

It should be understood by those skilled in the art that various modifications, combinations, sub-combinations, and alterations may occur depending on design requirements and other factors insofar as they are within the scope of the appended claims or the equivalents thereof.

What is claimed is:

1. A controller comprising:
circuitry configured to
selectively communicate with an electronic apparatus through a first communication system or a second communication system;
acquire system priority information from the electronic apparatus by communicating with the electronic apparatus through the first communication system, the electronic apparatus being capable of executing a plurality of functions, each of the plurality of functions corresponding to one or both of the first communication system and the second communication system;
select one of the first communication system and the second communication system, based on the system priority information;
receive instruction information instructing a function of the plurality of functions to be executed by the electronic apparatus;
determine, based on the received instruction information, the function instructed by the instruction information is a first function corresponding to the first communication system, the first function being executable only in the first communication system, a second function corresponding to the second communication system, the second function being executable only in the second communication system, or a third function corresponding to both of the first communication system and the second communication system, the third function being executable in both of the first communication system and the second communication system;
select the first communication system when the circuitry determines the first function is instructed by the instruction information;
select the second communication system when the circuitry determines the second function is instructed by the instruction information;
select one of the first communication system and the second communication system based on the system priority information when the circuitry determines the third function is instructed by the instruction information, the system priority information indicating which of the first communication system or the second communication system to use in communicating with the electronic apparatus when the third function executable in both of the first communication system and the second communication system is instructed by the instruction information;
communicate with the electronic apparatus through the selected communication system to control the electronic apparatus to execute the function instructed by the instruction information; and
control a display to display a first icon corresponding to the first function, a second icon corresponding to the second function, and a third icon corresponding to the third function, in one screen.

2. The controller according to claim 1, wherein
the first communication system is a short-distance wireless communication system,
the second communication system is a network communication system, and
the second function corresponding to the second communication system is a function to control a server connected to a network.

3. The controller according to claim 1, wherein
the first communication system is a network communication system, and
the second communication system is a short-distance wireless communication system.

4. The controller according to claim 1, wherein
the circuitry is further configured to:
communicate with another electronic apparatus through the first communication system or the second communication system;
acquire another system priority information from the another electronic apparatus by communicating with the another electronic apparatus through the first communication system, the another electronic apparatus being capable of executing a plurality of functions of the another electronic apparatus, each of the plurality of functions of the another electronic apparatus corresponding to one or both of the first communication system and the second communication system;
select one of the first communication system and the second communication system, based on the another system priority information;
receive, from the another electronic apparatus, another instruction information instructing a function of the plurality of functions of the another electronic apparatus;
determine, based on the received another instruction information, the function instructed by the another instruction information is the first function corresponding to the first communication system, the second function corresponding to the second communicating system, or the third function corresponding to both of the first communication system and the second communication system;
select the first communication system when the circuitry determines the first function is instructed by the another instruction information;
select the second communication system when the circuitry determines the second function is instructed by the another instruction information,
select one of the first communication system and the second communication system based on the another system priority information when the circuitry determines the third function is instructed by the another instruction information;
communicate with the another electronic apparatus through the selected communication system; and control a display to display one or a plurality of icons corresponded to the respective functions of the electronic apparatus and one or a plurality of icons corresponded to respective functions of the another electronic apparatus, in one screen.

5. The controller according to claim 1, wherein the circuitry communicates with the electronic apparatus through the first communication system to acquire identification information of the electronic apparatus in the second communication system.

6. The controller according to claim 1, wherein the circuitry communicates with the electronic apparatus through the first communication system to supply communication setting information for the second communication system to the electronic apparatus.

7. The controller according to claim 1, wherein the circuitry selects one of the first communication system and the second communication system, based on a device state or a device environment of the controller, in addition to the system priority information.

8. The controller according to claim 1, wherein the system priority information is generated by the electronic apparatus based on a device state or a device environment of the electronic apparatus.

9. The controller according to claim 8, wherein the device state is a state of charge of a battery or a power supplied state indicating that power is supplied from which of the battery and an AC power source.

10. The controller according to claim 8, wherein the device environment is a communication environment by the first communication system or the second communication system.

11. The controller according to claim 1, wherein the system priority information is transmitted from the electronic apparatus intermittently.

12. A control system comprising:
a controller; and
an electronic apparatus, wherein
the controller includes
first circuitry configured to
  selectively communicate with the electronic apparatus through a first communication system or a second communication system;
  communicate with the electronic apparatus through the first communication system to acquire system priority information from the electronic apparatus, the electronic apparatus being capable of executing a plurality of functions, each of the plurality of functions corresponding to one or both of the first communication system and the second communication system;
  select one of the first communication system and the second communication system, based on the system priority information;
  receive instruction information instructing a function of the plurality of functions to be executed by the electronic apparatus;
  determine, based on the received instruction information, the function instructed by the instruction information is a first function corresponding to the first communication system, the first function being executable only in the first communication system, a second function corresponding to the second communication system, the second function being executable only in the second communication system, or a third function corresponding to both of the first communication system and the second communication system, the third function being executable in both of the first communication system and the second communication system;
  select the first communication system when the circuitry determines the first function is instructed by the instruction information;
  select the second communication system when the circuitry determines the second function is instructed by the instruction information;
  select one of the first communication system and the second communication system based on the system priority information when the circuitry determines the third function is instructed by the instruction information, the system priority information indicating which of the first communication system or the second communication system to use in communicating with the electronic apparatus when the third function executable in both of the first communication system and the second communication system is instructed by the instruction information;
  communicate with the electronic apparatus through the selected communication system to control the electronic apparatus to execute the function instructed by the instruction information; and
  control a display to display a first icon corresponding to the first function, a second icon corresponding to the second function, and a third icon corresponding to the third function, in one screen, and
the electronic apparatus includes
second circuitry configured to
  selectively communicate with the controller through the first communication system or the second communication system;
  communicate with the controller through the first communication system to supply the system priority information to the controller;
  execute the plurality of functions; and
  generate the system priority information.

13. A control method comprising:
selectively communicating with an electronic apparatus through a first communication system or a second communication system;
acquiring system priority information from the electronic apparatus by communicating with the electronic apparatus through the first communication system, the electronic apparatus being capable of executing a plurality of functions, each of the plurality of functions corresponding to one or both of the first communication system and the second communication system;
selecting one of the first communication system and the second communication system, based on the system priority information;
receiving instruction information instructing a function of the plurality of functions to be executed by the electronic apparatus;
determining, using circuitry, based on the received instruction information, the function instructed by the instruction information is a first function corresponding to the first communication system, the first function being executable only in the first communication system, a second function corresponding to the second communication system, the second function being executable only in the second communication system, or a third function corresponding to both of the first communication system and the second communication system, the third function being executable in both of the first communication system and the second communication system;

selecting the first communication system when the circuitry determines the first function is instructed by the instruction information;

selecting the second communication system when the circuitry determines the second function is instructed by the instruction information;

selecting one of the first communication system and the second communication system based on the system priority information when the circuitry determines the third function is instructed by the instruction information, the system priority information indicating which of the first communication system or the second communication system to use in communicating with the electronic apparatus when the third function executable in both of the first communication system and the second communication system is instructed by the instruction information;

communicating with the electronic apparatus through the selected communication system to control the electronic apparatus to execute the function instructed by the instruction information; and controlling a display to display a first icon corresponding to the first function, a second icon corresponding to the second function, and a third icon corresponding to the third function, in one screen.

* * * * *